United States Patent [19]

Siegenthaler

[11] Patent Number: 5,204,049
[45] Date of Patent: Apr. 20, 1993

[54] METHOD FOR PREHEATING, CURING AND STABILIZING VEHICLE TIRES

[75] Inventor: Karl J. Siegenthaler, Ostia, Italy

[73] Assignee: Bridgestone/Firestone, Inc., Akron, Ohio

[21] Appl. No.: 725,852

[22] Filed: Jul. 3, 1991

[30] Foreign Application Priority Data

Jul. 27, 1990 [IT] Italy ............................. 67594 A/90

[51] Int. Cl.⁵ .................... B29C 35/02; B29C 35/16
[52] U.S. Cl. .................... 264/502; 264/326;
264/DIG. 65; 264/40.6; 425/38; 425/58.1;
425/DIG. 39; 425/73
[58] Field of Search ............... 425/32, 58.1, 28.1,
425/78, 40, 44, 50, 143, 445, 446, 29, 47, DIG.
39, 73; 264/501, 502, 315, 326, 237, 348, 37, 85,
DIG. 65, 40.6

[56] References Cited

U.S. PATENT DOCUMENTS

| | | |
|---|---|---|
| 1,746,357 | 2/1930 | Mihor .................... 425/28.1 |
| 2,066,265 | 12/1936 | Freeman . |
| 3,008,180 | 11/1961 | Woodall . |
| 3,075,237 | 1/1963 | Soderquist . |
| 3,170,187 | 2/1965 | Brundage . |
| 3,214,791 | 11/1965 | Ericson et al. . |
| 3,483,596 | 12/1969 | Ulm . |
| 3,621,520 | 11/1971 | Ulm . |
| 3,645,660 | 2/1972 | Hugger et al. . |
| 3,667,881 | 6/1972 | Cimprich . |
| 3,692,444 | 9/1972 | Hugger et al. . |
| 3,712,769 | 2/1973 | Cimprich . |
| 3,847,631 | 11/1974 | MacMillan .................... 264/315 |
| 4,092,090 | 5/1978 | Yuhas et al. . |
| 4,702,669 | 10/1987 | Ichikawa et al. . |
| 4,728,274 | 3/1988 | Siegenthaler .................... 425/44 |

FOREIGN PATENT DOCUMENTS

| | | |
|---|---|---|
| 50522 | 4/1982 | European Pat. Off. .............. 264/37 |
| 1282908 | 10/1964 | Fed. Rep. of Germany . |
| 62-11520 | 5/1987 | Japan .................... 264/85 |

Primary Examiner—Jeffery Thurlow
Assistant Examiner—Mathieu Vargot
Attorney, Agent, or Firm—Ernst H. Ruf

[57] ABSTRACT

A method of preheating, curing and stabilizing vehicle tires, whereby, just before being subjected to curing a first green tire (3) is preheated simultaneously with the stabilization of a second cured tire (6), thus using the heat given off by the second tire (6) as it is being stabilized.

7 Claims, 6 Drawing Sheets

METHOD FOR PREHEATING, CURING AND STABILIZING VEHICLE TIRES

TECHNICAL FIELD

The present invention relates to a method of preheating, curing and stabilizing vehicle tires.

BACKGROUND OF THE INVENTION

When manufacturing tires, particularly vehicle tires having internal body plies formed from nylon cords or other synthetic fibers which shrink when cooled, it is now customary to subject each tire, upon extraction from the curing mold, to a stabilizing operation generally consisting in mounting the tire on a support, inflating it to a given pressure, usually of about 3 atmospheres, and maintaining this pressure long enough for the tire to cool below a given temperature, usually of about 100° C.

Such a process, usually referred to as "post inflation", provides, not only for preventing the synthetic cords from shrinking, thus avoiding undesired distortion of the tire, but also for stabilizing the shape of the cords, which is extremely useful in terms of finished tire quality. Stabilizing cured tires poses a number of problems for the manufacturer: relatively high-cost facilities; the energy required for cooling the tires; and the total loss of the heat given off by the tires during stabilization.

Moreover, those skilled in the art are familiar with the problems faced by vehicle tire manufacturers for obtaining as homogeneous an output as possible from each facility, combined with a high quality standard compatible with minimum production cost. As homogeneous output depends solely, and particularly at the curing stage, in varying a relatively large number of parameters for adapting them to various continually variable external parameters, compromise solutions must often be adopted for limiting production cost. For instance, as the ambient temperature of a facility, which is undoubtedly the most decisive external variable, may fluctuate over a fairly wide range, the number of calories supplied to the green tires during curing would need to be varied continually as a function of initial green tire temperature. As this would be unacceptable in terms of cost, manufacturers frequently opt to over- rather than undercuring of tires.

This and other similar problems could be solved by uniforming the initial conditions of the green tires, for instance, by preheating them to a given constant temperature prior to curing. The additional cost involved at present for implementing such a solution, however, would be such as to be economically unfeasible.

SUMMARY OF THE INVENTION

The aim of the present invention is to provide a method whereby a variable parameter, such as the temperature at which green tires are fed to respective curing molds, may be brought to a uniform level at a substantially negligible cost.

With this aim in view, according to the present invention, there is provided a method of preheating, curing and stabilizing vehicle tires, characterized by the fact that it comprises a stage consisting in preheating a first green tire, and a simultaneous stage consisting in stabilizing a second cured tire; said first tire being preheated, prior to being loaded onto a curing unit, by exchanging heat with said second tire as it is being stabilized.

BRIEF DESCRIPTION OF THE DRAWINGS

A number of non-limiting embodiments of the present invention will be described will reference to the accompanying drawings, in which.

BEST MODE FOR CARRYING OUT THE INVENTION

Figure 1:
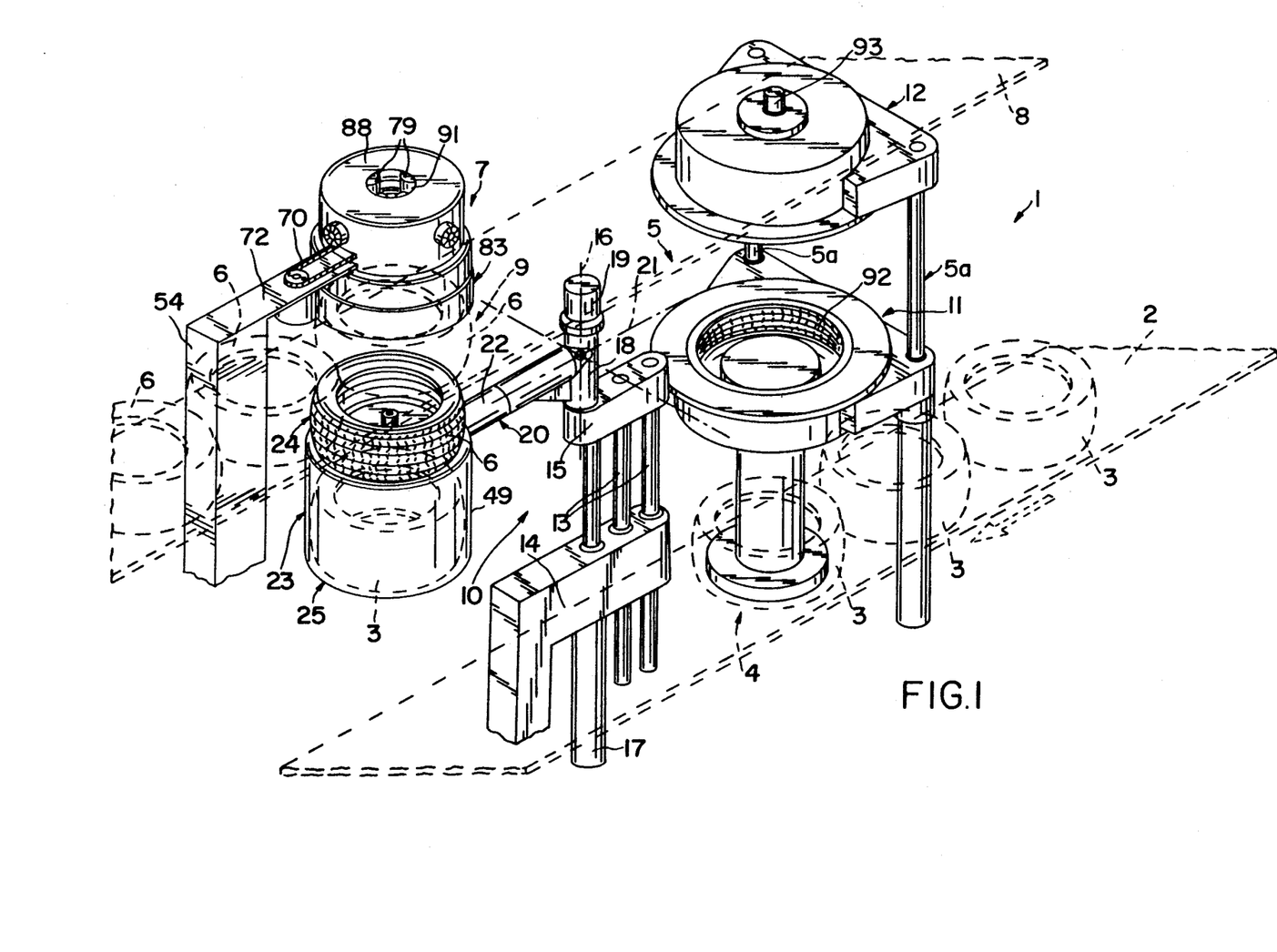
FIG. 1 shows a schematic view in perspective of a first preferred embodiment of a system implementing the method according to the present invention.

Number 1 in FIG. 1 indicates a tire curing system comprising a conveyor 2 for successively feeding green tires 3 to a loading station 4; a curing unit 5 for receiving tires 3 and producing cured tires 6; a unit 7 for stabilizing tires 6; a conveyor 8 for transferring tires 6 from an unloading station 9; and a transfer unit 10 for transferring both tires 3 from loading station 4 to curing unit 5, and tires 6 from curing unit 5 to unloading station 9 through stabilizing unit 7.

Curing unit 5 is of known type as described, for example, in U.S. Pat. No. 4,747,765, the content of which is fully incorporated herein by reference. Unit 5 comprises a lower portion 11 and an upper portion 12 designed to move in relation to each other, by virtue of hydraulic lifting devices 5a, between a closed curing position (not shown) and an open position (FIG. 1) for unloading cured tire 6 and loading green tire 3.

Figure 2:
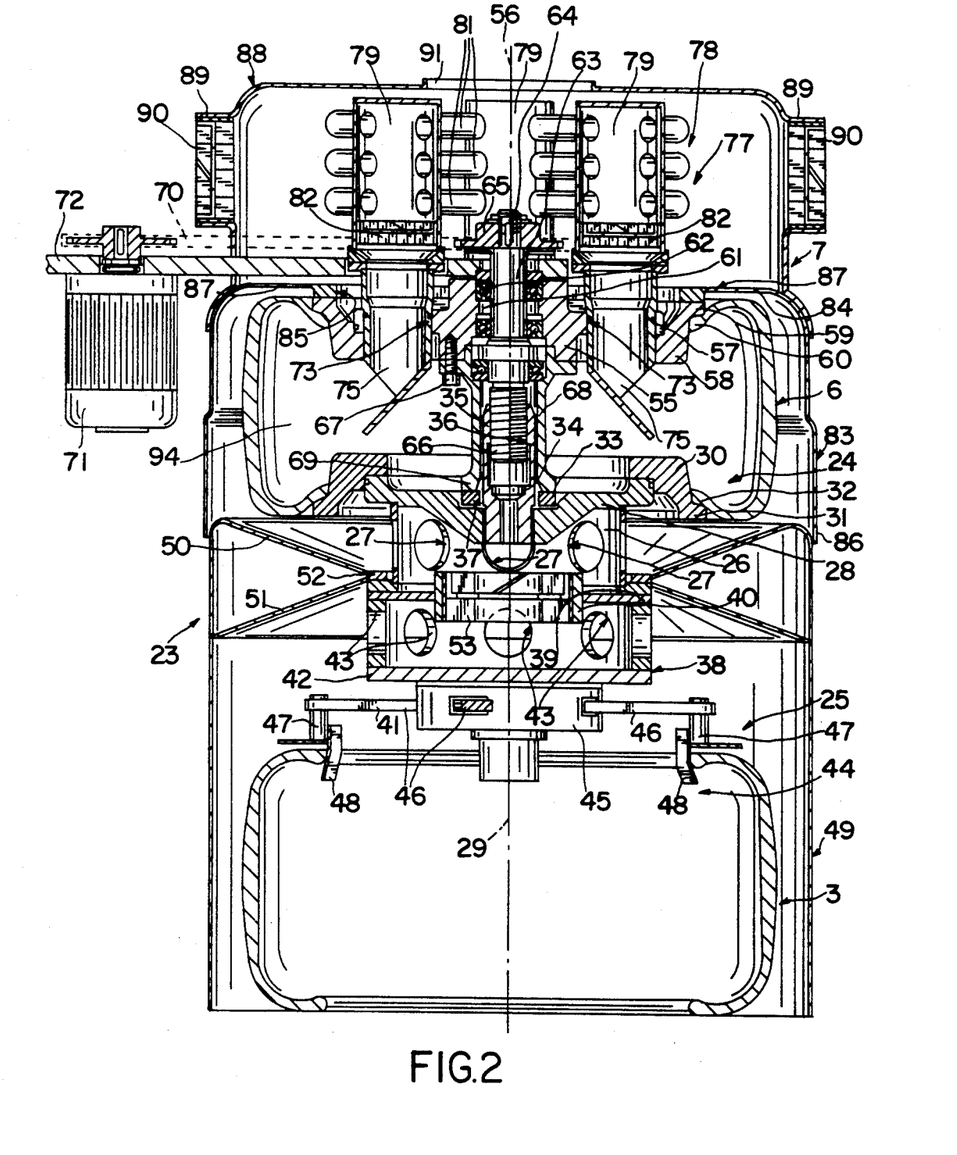
FIG. 2 shows a larger-scale axial section of a detail in FIG. 1 in a specific operating position.

Transfer unit 10 comprises two guide columns 13 extending upwards from a fixed base 14 and connected by an upper crosspiece 15 designed to move parallel to a vertical axis 16 in relation to base 14 by virtue of a hydraulic actuator 17. Crosspiece 15 is connected to a coupling 18 coaxial with axis 16 and connected to an actuator 19 so as to turn in relation to crosspiece 15 about axis 16. From coupling 18, there extends radially outwardly an arm 20 having an axis 21 perpendicular to axis 16, and comprising a first fixed portion integral with coupling 18, and a second portion 22 designed to turn in relation to coupling 18 about axis 21 by virtue of an angular actuator (not shown) housed inside the fixed portion of arm 20. Transfer unit 10 also comprises a loading-unloading device 23 connected integral with the free end of portion 22 of arm 20. As shown in FIG. 2, unit 23 comprises an upper unit 24 for supporting tire 6, and a lower unit 25 for suspending tire 3 coaxially with tire 6.

Unit 24 comprises a tubular body 26 integral with arm 21 and having a number of radial openings 27. The top end of tubular body 26 is fitted with a substantially round plate 28 having a vertical axis 29 and the outer edge of which is connected to the upper inner surface of an annular, substantially truncated-cone body 30 coaxial with axis 29 and tapering upwards. The lateral surface of annular body 30 presents a flange 31 defining a supporting surface for a bead portion 32 of tire 6. Plate 28 presents an upper central cavity 33 coaxial with axis 29 and having a central threaded through hole 34 engaged by a threaded portion of a tubular appendix 35 extending upwardly from plate 28 and having a threaded axial hole 36 coaxial with axis 29.

Cavity 33 houses a tubular spacer 37 fitted onto appendix 35 and selectable from a series of spacers (not shown) of the same type but differing in thickness. Unit 25 is connected integrally with the bottom end of tubular body 26, and comprises a cylindrical casing 38 having a flat upper wall 39 fitted through with a coupling 40 coaxial with axis 29 and enabling communication between the inside of tubular body 26 and the inside of casing 38; a flat lower wall 41 parallel to wall 39; and a cylindrical lateral wall 42 having a number of radial openings 43.

The lower surface of wall 41 is fitted integrally with a know gripping device 44 for a tire 3. Device 44 comprises, in known manner, a central actuator 45 having a number of output rods 46 designed to move substantially radially between a withdrawn position (not shown) and an expanded position (FIG. 2). The free end of each rod 46 presents a pin 47 parallel to axis 29 and fitted on the bottom end with a substantially T-shaped bracket 48 for supporting and gripping a bead portion of respective tire 3 and suspending tire 3 beneath cylindrical casing 38 and inside a downward-facing cylindrical bell 49 defined at the top by an annular truncated-cone upper wall 50 and an annular truncated-cone deflector 51, tapering in opposite directions and extending outwardly from a ring 52 connected integrally with wall 39. Unit 25 also comprises a powered fan 53 housed inside coupling 40 enabling communication between tubular body 26 and casing 38.

As shown in FIG. 1, stabilizing unit 7 is connected integrally with the free end of a fixed upright 54 and, as shown in FIG. 2, comprises a central hub 55 having a vertical axis 56 and an outer flange 57, the outer edge of which is connected in removable manner (not shown) to an inner peripheral portion of an annular, substantially truncated-cone body 58 coaxial with axis 56 and substantially similar to annular body 30. As in the case of annular body 30, the lateral surface of annular body 58 presents a flange 59 defining a supporting surface for a respective bead portion 60 of tire 6.

Through hub 55, there is formed an axial hole 61 housing, via the interposition of a number of bearings 62, a rotary shaft 63, one portion 64 of which projects from the top of hub 55 and is fitted with a toothed pulley 65, and another externally threaded portion 66 of which projects from the bottom of hub 55 and is designed to engage threaded hole 36 in appendix 35 when device 23 is located directly beneath stabilizing device 7.

The downward-facing surface of hub 55 is fitted, by means of screws 67, with the outer flange of a tubular appendix 68 coaxial with axis 56, longer than appendix 35, and having an inside diameter at least equal to the outside diameter of same. The bottom end of tubular appendix 68 presents a flange 69 by which appendix 68 rests in fluid-tight manner on the upper surface of spacer 37 when portion 66 of shaft 63 engages appendix 35 subsequent to upward displacement of device 23 by actuator 17, and rotation of pulley 65 by a toothed belt 70 powered by a reversible motor 71 supported on a plate 72 integral with both the top end of hub 55 and the top of upright 54.

Flange 57 presents a first and second pair of axial holes 73 located in perpendicular planes through axis 56. Holes 73 located in perpendicular planes through axis 56. Holes 73 are engaged in fluid-tight manner by respective inlet and outlet conduits 75 of a circuit 77 for circulating pressurized fluid, preferably nitrogen, supplied to circuit 77 through a known inlet and drain valve (not shown). One portion of circuit 77 consists of a radiator 78 mounted over hub 55 and comprising vertical pipes 79 each connected to the top end of a respective conduit 75. Radiator 78 also comprises a number of transverse loop conduits 81 connecting pipes 79. For force circulating said pressurized fluid along circuit 77, each vertical pipe 79 houses an appropriately oriented powered fan 82.

Stabilizing unit 7 comprises a conveyor bell 83 with a base wall 84 perpendicular to axis 56 and having a central hole 85 substantially equal in diameter to the inside diameter of the wider upper end of annular body 58. Wall 84 is secured, via means not shown, to the upper end surface of annular body 58, and is fitted on its outer edge with a substantially cylindrical lateral wall 86 facing downwardly, the bottom end thereof being fitted onto bell 49.

Through wall 84 and coaxially with central hole 85, there is formed a ring of openings 87 enabling communication between bell 83 and a substantially cylindrical conveyor 88 surrounding radiator 78 and having its bottom end connected to wall 84 outwardly of openings 87. Through conveyor 88, there are mounted a number of radial conduits 89 communicating externally, each conduit housing a powered extractor 90, and having an upper axial conduit 91 coaxial with axis 56.

Operation of system 1 will now be described commencing from the startup stage wherein curing unit 5 and loading-unloading device 23 are empty, and a green tire 3 is fed by conveyor 2 to loading station 4. At this point, actuator 19 is operated for positioning device 23 over tire 3 in loading station 4; and actuator 17 is operated for lowering device 23, gripping tire 3 via gripping device 44, and raising device 23 with tire 3 suspended on unit 25 and inside bell 49.

Actuator 19 is then operated once more for moving arm 20 towards curing unit 5 and positioning device 23 between upper and lower portions 12 and 11 already opened by hydraulic devices 5a. Once device 23 is coaxial with portions 11 and 12 of curing unit 5, gripping device 44 is operated so as to withdraw rods 46 and deposit tire 3 inside lower half mold 92 on lower portion 11 of unit 5. Device 23 is then withdrawn from unit 5, which is closed for curing green tire 3 and producing cured tire 6. During the curing process, device 23 is moved into station 4 for picking up another green tire 3 and transferring it to unit 5.

Upon completion of the curing process, curing unit portions 11 and 12 are parted by devices 5a, which results, in a known manner, in tire 6 being detached from lower portion 11 and remaining attached to upper portion 12. Device 23 is then inserted once more between portions 11 and 12, so that unit 24 is located beneath tire 6, and unit 25, on which the next green tire 3 is suspended or carried, is located over lower half mold 92. At this point, tire 6 is detached from portion 12 by a known prior art extracting device 93 and deposited onto annular body 30 with bead portion 32 substantially resting on flange 31, and the next green tire 3 is deposited onto half mold 92 by withdrawing rods 46 on device 44.

Device 23 is then withdrawn from curing unit 5 by actuators 19 and 17, moved over to loading station 4 to pick up the next green tire 3, and, with tire 6 located on unit 24 and tire 3 suspended on unit 25, is positioned beneath stabilizing unit 7, coaxial with axis 56. Actuator 17 is then operated so as to raise device 23 and gradually bring tubular appendix 35 into engagement with appendix 68 and subsequently into contact with the bottom end of lower portion 66 of shaft 63. Operation of motor 71 gradually engages portion 66 of shaft 63 and appendix 35, so as to bring flange 69 of appendix 68 into fluid-tight contact with the upper surface of spacer 37, which is so selected that, subsequent to fluid-tight contact of flange 69 and spacer 37, bead portion 60 of tire 6 substantially contacts flange 59 which is located a given distance from flange 31, thus contacting bead portion 32. This defines, between units 7 and 24, an annular chamber 94 extending inwardly of tire 6 and forming part of circuit 77. Chamber 94 connects conduits 75 of circuit 77, which may now be fed with said pressurized fluid for inflating tire 6, engaging bead portions 32 and 60 of tire 6 in a fluid-tight manner with respective flanges 31 and 59, and outwardly sealing, in a fluid-tight manner, chamber 94.

At this point, fans 82 and 53 may be operated for force circulating said fluid along circuit 77 and through radiator 78, which is swept from above by a stream of cooling air drawn in by fan 53 through conduit 91, conveyor 88, openings 87, the gap between bell 83 and the outer surface of tire 6, as well as openings 27. Said air stream provides for rapidly cooling the pressurized fluid circulating at high speed inside circuit 77, and therefore for rapidly cooling tire 6 in its entirety from the inside out until the required stabilizing temperature is reached. As it flows along the gap between tire 6 and bell 83, said air stream also provided for cooling the outer surface of tire 6.

The air extracted from bell 83 through conduit 40 is fed by fan 53 through openings 43, into bell 49, and over the outer surface of green tire 3, which is thus heated to a given temperature, generally within the same time it takes for cured tire 6 to reach its stabilizing temperature. Alternatively, upon tire 3 reaching the required temperature, known control means (not shown) provide for stopping fan 53 and activating extractors 90, which continue to cool tire 6 without affecting the temperature of tire 3.

Known compensating members (not shown) obviously provide for maintaining the fluid inside circuit 77 at a given constant pressure during cooling. In other words, on the one hand, the same pressurized fluid is used for both inflating tire 6 and stabilizing it by cooling it from the inside; while, on the other hand, the same heat exchange fluid is used for both cooling said pressurized fluid and the outer surface of tire 6, and preheating green tire 3 to a given temperature, which is substantially constant and the same for each of tire 3, before it is loaded onto curing unit 5. An important point to note in connection with the above is that tire 3 is substantially preheated solely with the heat given off by tire 6 as it is stabilized.

Once tire 6 is stabilized and tire 3 preheated, device 23 is detached from unit 7 and moved by actuators 17 and 19 over to unloading station 9, where portion 22 of arm 20 is turned 180° about axis 21 so as to unload tire 6 onto conveyor 8. Device 23 is then restored to its original position, with unit 24 on top, and moved over to curing unit 5 to commence the next cycle by loading preheated tire 3 onto unit 5 and simultaneously picking up the next cured tire 6 as already previously described.

Figure 3:
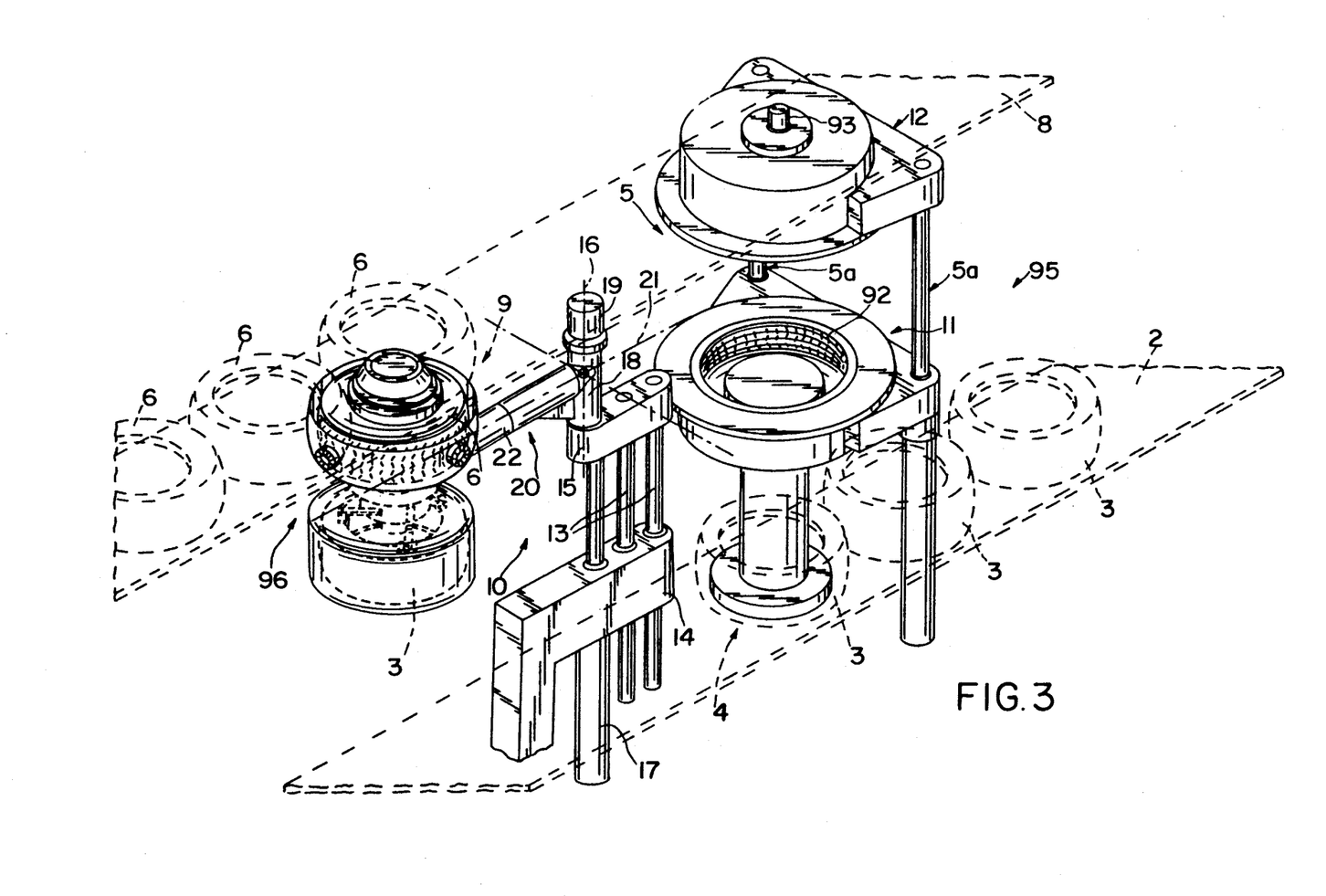
FIG. 3 shows a schematic view in perspective of a second preferred embodiment of a system implementing the method according to the present invention.
Figure 4:
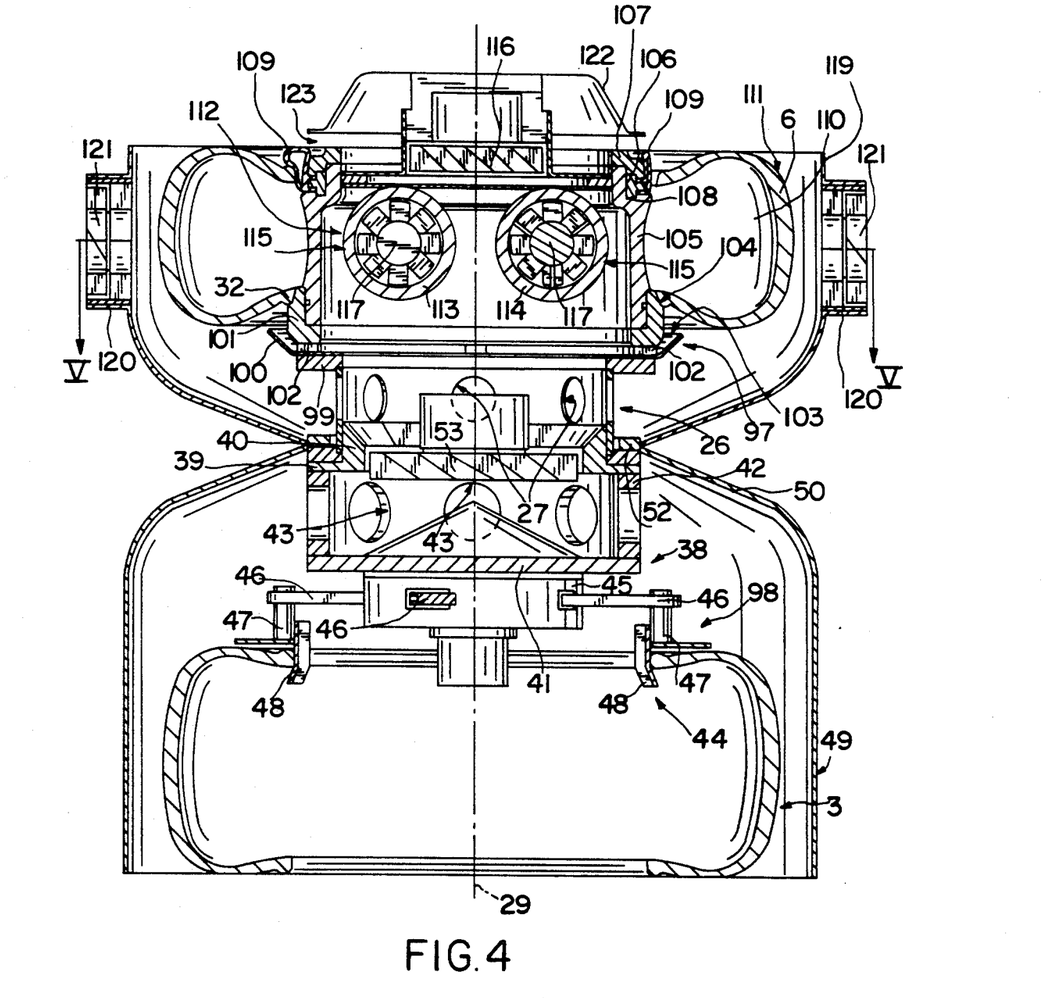
FIG. 4 shows a larger-scale axial section of a detail in FIG. 2.
Figure 5:
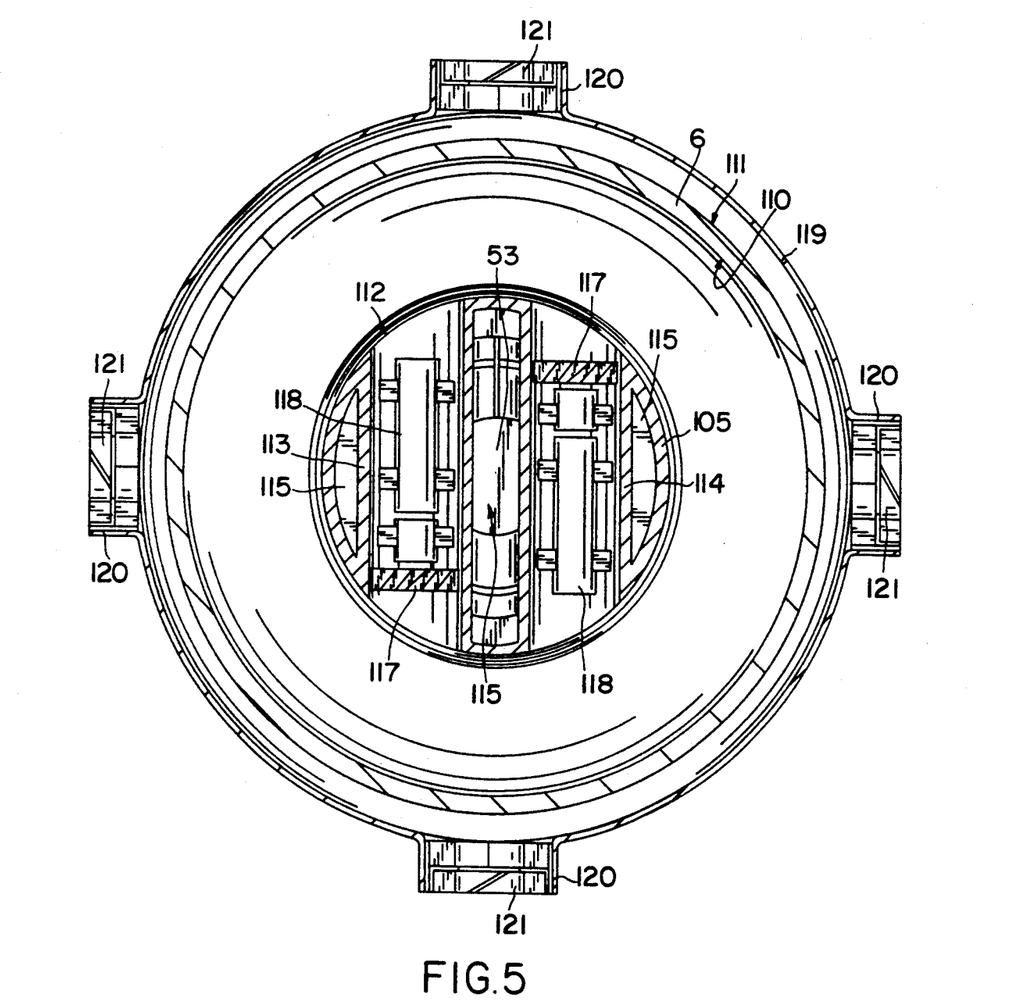
FIG. 5 shows a section along line V—V in FIG. 4.

The FIG. 3 embodiment relates to a tire curing system 95 similar to system 1, the corresponding component parts of which are indicated using the same numbering system. The main difference between systems 95 and 1 is that stabilizing unit 7 is deleted in system 95 and, in place of loading-unloading device 23, portion 22 of arm 20 is connected to a mobile or movable loading, unloading and stabilizing unit 96. As shown in FIGS. 4 and 5, mobile unit 96 comprises an upper unit 97 for supporting and stabilizing tire 6, and defined at the bottom by a tubular body 26 identical to tubular body 26 on system 1; and a lower unit 98 for suspending tire 3, which unit 98 is identical to unit 25 on system 1 and the corresponding component parts of which are indicated using the same numbering system.

The top end of tubular body 26, which presents a ring of openings 27, is fitted with an outer flange 99, the upper surface of which is fitted with an annular deflector 100. An outer peripheral portion of annular deflector 100 is bent upwardly about the bottom end of an annular body 101 supported on deflector 100 via the interposition of a number of radial inserts 102 defining an annular passage 103 between deflector 100 and the bottom end of annular body 101.

Annular body 101 presents, on the top end, an outer groove defining a seat 104 for bead portion 32 of tire 6, and is engaged by a lower portion of a toroidal body 105 extending upwards from annular body 101 and coaxial with axis 29. The top end of toroidal body 105 presents an annular groove 106 inside which is fitted, in known manner by means of an upper ring 107, an annular foot 108 for an annular bladder 109 which, when deflated, presents, as shown to the right of axis 29 in FIG. 4, an outside diameter smaller than the inside diameter of tire 6. When inflated, on the other hand, by means of a pressurized fluid supply device (not shown), bladder 109 constitutes an annular element for supporting and retaining bead portion 60 of tire 6 in fluid-tight manner.

When inflated and contacting tire 6, mounted on toroidal body 105, bladder 109 defines, inside tire 6, a toroidal chamber 110 forming part of a circuit 111 for circulating a heat exchange fluid fed at a given pressure into circuit 111 by a known valve device (not shown) for inflating tire 6. As shown more clearly in FIG. 5, circuit 111, which corresponds to circuit 77 on system 1, comprises a radiator 112 defined by two parallel pipes 113 and 114 extending transversely in relation to axis 29 through toroidal body 105, and defining, inside toroidal body 105, three passages 115 parallel to axis 29 and communicating at the bottom with tubular body 26 and at the top with the delivery side of a powered fan 116 coaxial with axis 29 and connected to the top end of toroidal body 105. For circulating said heat exchange fluid along circuit 111, pipes 113 and 114 house respective oppositely-oriented powered fans 117. In order to increase the heat exchange surface, pipes 113 and 114 also house respective inner conduits 118.

As shown in FIG. 4, fitted to ring 52, which secures bell 49 to wall 39 of casing 38, is the bottom end of a bell 119 arranged upwardly, coaxially with axis 29 and outwardly of tire 6, and having its open top end substantially on a level with the top end of toroidal body 105. Bell 199 presents a number of radial conduits 120, each housing a powered extractor 121. Finally, a bell type conveyor 122 conveys outside air to the inlet of fan 116 through an annular opening 123 defined between ring 107 and the periphery of conveyor 122.

Figure 6:
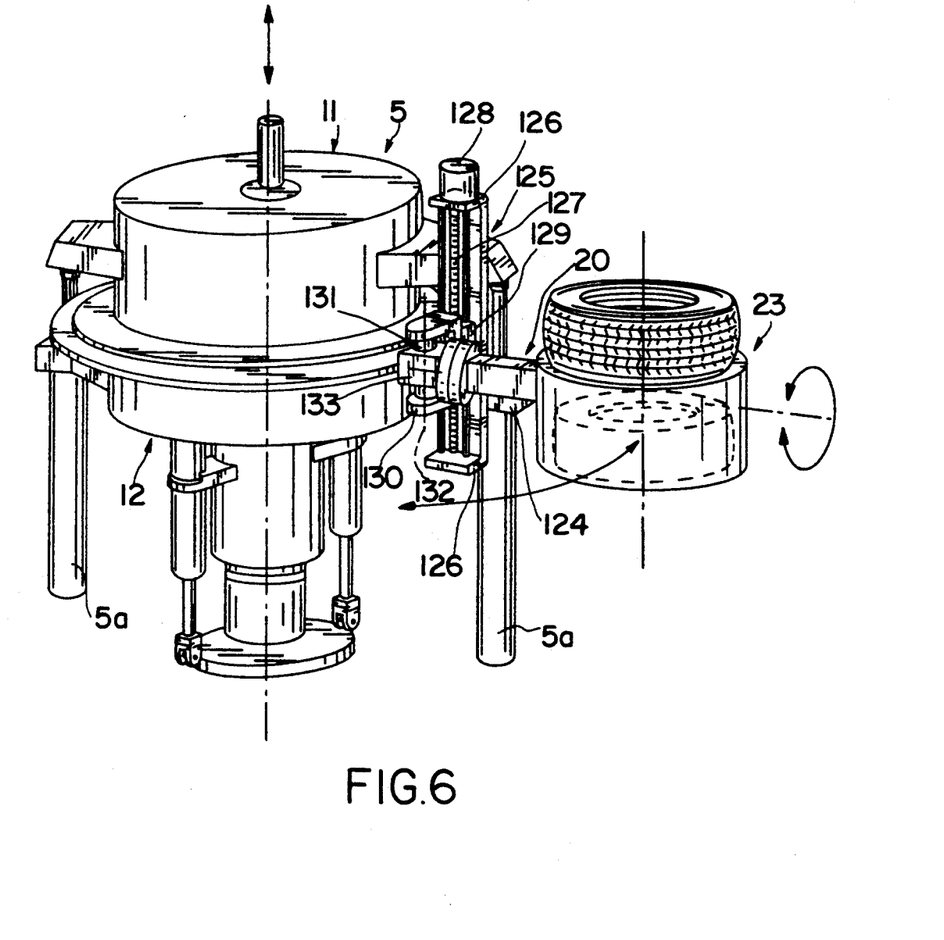
FIG. 6 shows a schematic view, with parts removed for simplicity, of a variation to a detail in FIGS. 1 and 3.

According to the variation shown in FIG. 6, instead of being supported independently, arm 20 is supported directly on tire curing unit 5. For this purpose, a vertical guide 125, having the same function as columns 13 in FIG. 1, is connected to an apron 124 fitted to lower portion 11 of unit 5 for connecting lifting devices 5a. Guide 125 is defined, at its opposite ends, by two transverse plates 126 between which is mounted a rotatable screw 127 which, together with its drive motor 128, constitutes an actuator, similar to 17 in FIG. 1, for moving, along guide 125, a slide 129 similar to crosspiece 15 and connected in a sliding manner to guide 125. Slide 129 is connected integrally with a fork 130 which supports a rotary pin 131 extending along an axis 132 corresponding with axis 16 in FIG. 1, and powered (in a manner not shown) so as to turn about axis 132. Pin 131 is connected integrally with the outer casing of an angular actuator 133 constituting a first portion of arm 20, the second portion 22 of which is connected to loading-unloading unit 23 or, according to a variation not shown, mobile unit 96. Portion 22 extends along axis 21, and is designed to turn about axis 21 by virtue of actuator 133.

From the foregoing description and the operational discussion, when read in light of the several drawings, it is believed that those familiar with the art will readily recognize and appreciate the novel concepts and features of the present invention obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of preheating, curing and stabilizing vehicle tires, comprising the step of preheating a first green tire, and a simultaneous step of stabilizing a second cured tire; said first tire being preheated, prior to being located into a curing unit, by exchanging heat with said second tire as it is being stabilized by positioning said first and second tires adjacent to each other, said second tire being positioned in a stabilizing unit; inflating said second tire to a given pressure by means of a first pressurized fluid; cooling said second tire by circulating a stream of a second fluid in contact externally with said second tire; and preheating said first tire simultaneously by directing said stream of said second fluid over same.

2. A method as claimed in claim 1, comprising the further step of performing said cooling operation, at least partially, by cooling said second tire from the inside by circulating said first pressurized fluid along a closed circuit defined by said second tire and by radiator means outside same; said stream of said second fluid being directed successively over said radiator means and said first tire.

3. A method of preheating, curing and stabilizing vehicle tires, comprising the steps of preheating a first green tire and simultaneously stabilizing a second cured tire within a mobile transfer unit which includes a lower unit for carrying said first tire and an upper unit for supporting said second tire, said lower and upper units being integral and aligned with each other, said transfer unit operating between a curing unit having upper and lower portions with said second tire remaining attached to said upper portion; inserting said mobile transfer unit between said upper and lower curing unit portions with said upper portion being located beneath said second tire, and said lower unit being located over said lower portion; positioning said first and second tires adjacent to each other; inflating said second tire to a given pressure by means of a first pressurized fluid; cooling said second tire, at least partially, by cooling said second tire from inside by circulating said first pressurized fluid along a closed circuit defined by said second tire and by radiator means outside said second tire; circulating a stream of a second external fluid over said radiator means and said first tire successively; preheating said first tire by directing said stream of said second fluid over said first tire to effectuate a heat transfer; opening said curing unit when said second tire is fully cured, with said second tire remaining attached to said upper portion; releasing said first tire into said lower portion and unloading said second tire onto said upper unit; withdrawing said mobile unit from said curing unit and closing said curing unit for curing said first tire; picking up a further first tire by means of said lower unit; performing said heat exchange between said second and first tires on said mobile unit; and unloading said second tire, once said second tire is stabilized, at an unloading station.

4. A method as claimed in claim 3, comprising the further step of when stabilized, unloading said second tire by rotating said mobile unit.

5. A method as claimed in claim 4, comprising the further step of performing said heat exchange as said mobile unit in transferred between said curing unit and said unloading station.

6. A method as claimed in claim 5, comprising the further step of performing said heat exchange by engaging said upper unit with a fixed stabilizing unit via the interposition of said second tire; said upper and stabilizing units cooperating in a fluid-tight manner with said second tire so as to define, with same, a fluid-tight chamber; said chamber forming part of a closed circuit for a pressurized fluid which is utilized to inflate said second tire to a given pressure; said closed circuit including radiator means supported on said stabilizing unit outside said second tire; and said pressurized fluid being force circulated along said closed circuit.

7. A method as claimed in claim 5, comprising the further step of performing said heat exchange by locking said second tire in a fluid-tight manner on an annular support on said upper unit so as to define, with said second tire, a fluid-tight chamber; said chamber forming part of a closed circuit for a pressurized fluid which is utilized to inflate said second tire to a given pressure; said closed circuit comprising radiator means supported on said upper unit outside said second tire; and said pressurized fluid being force circulated along said closed circuit.

* * * * *